(12) United States Patent
Mizuno (10) Patent No.: US 7,644,241 B2
(45) Date of Patent: Jan. 5, 2010

(54) DATA PROCESSING APPARATUS, AND THE CONTROL METHOD, PROGRAM, AND STORAGE MEDIUM THEREOF

(75) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 433 days.

(21) Appl. No.: 11/756,146

(22) Filed: May 31, 2007

(65) Prior Publication Data

US 2007/0288704 A1 Dec. 13, 2007

(30) Foreign Application Priority Data

Jun. 7, 2006 (JP) .............. 2006-158632

(51) Int. Cl.
*G06F 12/00* (2006.01)
(52) U.S. Cl. ..................................... 711/158
(58) Field of Classification Search ........................ None
See application file for complete search history.

(56) References Cited

U.S. PATENT DOCUMENTS

| 6,692,167 | B2 * | 2/2004 | Nakadaira et al. ............. 400/61 |
| 7,139,094 | B2 * | 11/2006 | Blasio et al. ............... 358/1.16 |
| 7,443,527 | B1 | 10/2008 | Shigeeda |
| 2002/0085244 | A1 * | 7/2002 | Blasio et al. .............. 358/474 |
| 2004/0125414 | A1 * | 7/2004 | Ohishi et al. ............... 358/402 |
| 2005/0270557 | A1 * | 12/2005 | Ookuma .................... 358/1.13 |
| 2006/0132845 | A1 * | 6/2006 | Itaki et al. .................. 358/1.15 |

FOREIGN PATENT DOCUMENTS

| CN | 1479197 A | 3/2004 |
| JP | 2004-015496 A | 1/2004 |
| JP | 2005-094444 A | 4/2005 |
| JP | 2006-101194 A | 4/2006 |

\* cited by examiner

*Primary Examiner*—Hiep T Nguyen
(74) *Attorney, Agent, or Firm*—Canon U.S.A., Inc., IP Division (57) ABSTRACT

History information of storage destinations designated for storing data input to an image processing device is managed. The priorities of a plurality of storage areas which are storage destination candidates are determined based on the managed history information. To assist a user designate a storage destination, a display unit displays information indicating the plurality of storage areas arranged based on the determined priorities. Based on the displayed information, the user designates one of the storage areas as the storage destination. A control unit effects control so as to store the data in the storage area designated by the user.

22 Claims, 10 Drawing Sheets

| | 501 | 502 | 503 | 504 | 505 | 506 |
|---|---|---|---|---|---|---|
| No. | DATE | USER | GROUP | LOCATION | OPERATION | STORAGE DESTINATION |
| 1 | JAN. 1, 2006 | 1111 | A | 123.456.789.001 | SCAN | 123.456.789.002 |
| 2 | FEB. 1, 2006 | 2222 | A | 123.456.789.001 | SCAN | 123.456.789.002 |
| 3 | FEB. 15, 2006 | 3333 | B | 123.456.789.001 | SCAN | 123.456.789.003 |
| 4 | MAR. 3, 2006 | 1111 | A | 123.456.789.002 | SCAN | 123.456.789.005 |
| 5 | APR. 10, 2006 | 4444 | C | 123.456.789.002 | SCAN | 123.456.789.003 |

| USER Wn(a) | PERSON HIMSELF | 1.5 |
|---|---|---|
| | SAME GROUP | 1.2 |
| | ETC. | 0.9 |
| TIME AND DATE Wn(b) | WITHIN THE PAST THREE DAYS | 1.5 |
| | WITHIN THE PAST ONE WEEK | 1.3 |
| | WITHIN THE PAST ONE MONTH | 1.1 |
| | THERETOFORE | 0.5 |
| LOCATION Wn(c) | SAME DEVICE | 2.1 |
| | SAME FLOOR | 1.8 |
| | SAME BUILDING | 1.5 |
| | ETC. (INCLUDING UNKNOWN) | 0 |

| No. | DATE | USER | GROUP | LOCATION | OPERATION | STORAGE DESTINATION | STORAGE AREA |
|---|---|---|---|---|---|---|---|
| 1 | JUL. 1, 2006 | 5555 | E | 123.456.789.001 | SCAN | 123.456.789.001 | BOX 1 |
| 2 | AUG. 1, 2006 | 6666 | F | 123.456.789.001 | SCAN | 123.456.789.002 | "MINUTES" |
| 3 | SEP. 15, 2006 | 5555 | G | 123.456.789.001 | SCAN | 123.456.789.001 | BOX 2 |
| 4 | SEP. 18, 2006 | 4444 | F | 123.456.789.002 | SCAN | 123.456.789.005 | "DIARY" |
| 5 | OCT. 1, 2006 | 2222 | F | 123.456.789.002 | SCAN | 123.456.789.003 | "YAMADA" |

FIG. 12

DATA PROCESSING APPARATUS, AND THE CONTROL METHOD, PROGRAM, AND STORAGE MEDIUM THEREOF

BACKGROUND OF THE INVENTION

1. Field of the Invention

The present invention relates to an apparatus (e.g., multi-function apparatus having scanning and printing functions) capable of enabling a user to select a storage destination to store data, and the control method, program, and storage medium thereof.

2. Description of the Related Art

Heretofore, a technique for storing input data in a storage device such as a HDD (Hard Disk Drive) or the like has been known. For example, with a multi-function apparatus including a scanner apparatus or printer apparatus, the data scanned and input by the scanner apparatus can be stored in an HDD included in the multi-function apparatus. Also at this time, an arrangement may be made wherein the storage area of the HDD is divided into a plurality of storage areas beforehand, which can be employed as personal boxes by assigning a password to each of users, for example.

Also, in recent years, such a multi-function apparatus has been used by being connected to a network in many cases, whereby the multi-function apparatus can be used by collaborating with a plurality of external apparatuses. In such a case, for example, the data scanned and input by a scanner apparatus included in the multi-function apparatus can also be directly stored in the storage area included in an external apparatus connected thereto via a network.

Now, when selecting a storage destination from a plurality of candidates to store data input via a scanner apparatus of a multi-function apparatus, a user sometimes must take too much time and effort to select the storage destination. A problem sometimes occurs particularly in the case of employing a storage area by dividing it into a plurality of storage areas, in the case of setting a hierarchical structure, or in the case of connecting to a plurality of external apparatuses. In other words, a great number of candidates selectable as a storage destination can cause a user to designate an erroneous storage destination, or to take too much time in searching for a desired storage destination in some cases.

In order to solve such a problem, for example, a scanner apparatus has been known wherein a plurality of information indicating a storage destination are registered beforehand, and when actually selecting a storage destination of data, only the storage destination in a running state is displayed in a selectable manner (see Japanese Patent Laid-Open No. 2005-94444, for example).

Also, a system has been known wherein storage areas (boxes) which were divided for each group to which respective users belong are assigned beforehand, an operating user is authenticated, and the box assigned to the group to which the user belongs is displayed in a selectable manner (see Japanese Patent Laid-Open No. 2006-101194, for example).

However, the above-mentioned existing techniques cause the following problems. For example, even if an arrangement is made wherein a plurality of storage destination information are registered beforehand so as to be displayed, but in the event that there are a great number of selectable storage destinations, there is a possibility that it may still take too much time for a user to find a desired storage destination.

Also, in the event that a screen for displaying selectable storage destination candidates is small, a great number of storage destination candidates may cause a user to take too much time for searching a desired storage destination.

Also, for example, even in the event that a storage destination is registered by being correlated with a certain user beforehand, frequently used storage destinations sometimes differ depending on a date or place wherein the user performs operations. For example, there is a case wherein a certain user frequently designates an external apparatus A as a storage destination on weekdays, but frequently designates an external apparatus B as a storage destination on holidays; with the existing techniques, the fixed storage destination candidate is always displayed, which is not user-friendly.

SUMMARY OF THE INVENTION

Embodiments of the present invention have been made in light of the above-mentioned problem, and provide a data processing apparatus, and the control method, program, and storage medium thereof. According to an embodiment, in an event of displaying information for selecting a storage destination to store input data, the priority of each of the storage destinations is determined, and information indicating each of storage destinations is displayed based on the determined priorities.

According to an embodiment of the present invention, there is provided an apparatus (e.g., multi-function apparatus including a scanning unit and a printing unit) including: an input unit configured to input data; a storing unit configured to perform storing processing in which the data input by the input unit is stored in a storage area designated as a storage destination; a management unit configured to manage the history information of the storing processing performed by the storing unit; a determination unit configured to determine the priorities of a plurality of storage areas which are storage destination candidates according to the history information managed by the management unit; a display unit configured to display information indicating the plurality of storage areas based on the priorities determined by the determination unit; and a control unit configured to control the storing unit to store the data in the storage area designated by a user according to the information displayed by the display unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE EMBODIMENTS

Embodiments of the present invention will be described below.

First Embodiment

Figure 1:
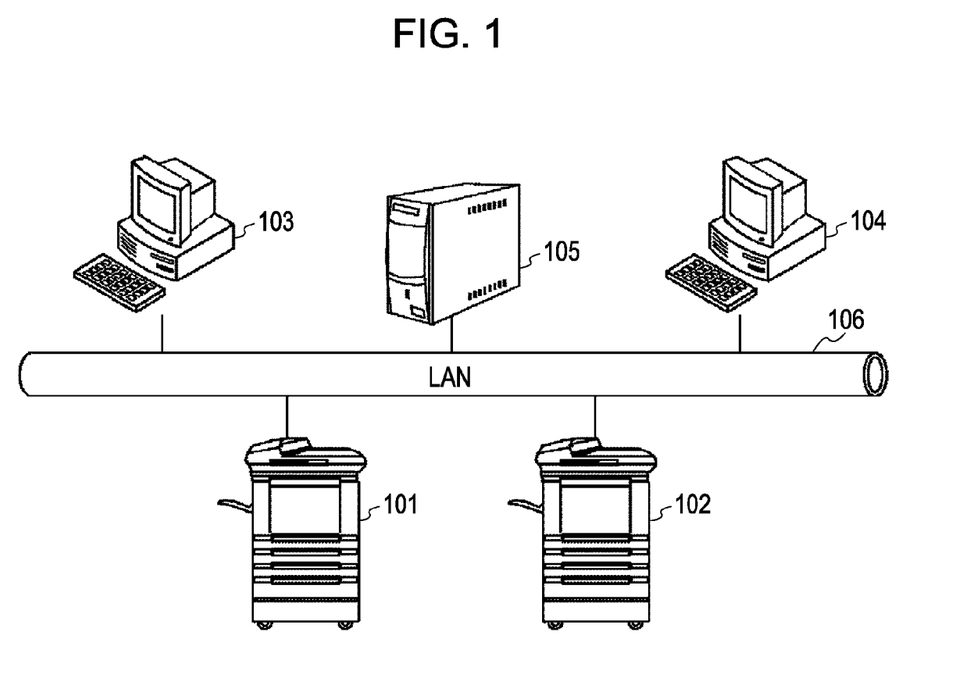
FIG. 1 is a system configuration diagram illustrating the overall configuration of a data processing system according to an embodiment of the present invention.

First, the overall configuration of a data processing system according to a first embodiment of the present invention will be described with reference to FIG. 1. A multi-function apparatus 101 includes a scanner apparatus and a printer apparatus and so forth, which prints image data obtained by scanning an original, or sends this to another apparatus connected thereto via a network. A multi-function apparatus 102 includes the same functions as those of the multi-function apparatus 101, and is connected to the multi-function apparatus 101 via a LAN 106. The LAN 106 is a local area network for connecting the respective apparatuses, and is connected to the Internet.

A PC 103 and a server 105 are each connected to the multi-function apparatus 101 via the LAN 106, and includes a storage device for storing data sent from the multi-function apparatus 101. An authentication server 104 manages authentication information for authenticating users, in the event of each of users using each of the apparatuses over the LAN 106, such as the multi-function apparatus 101 or the like. The authentication server 104 performs user authentication by comparing the user information sent from each of the apparatuses with the user information managed within the authentication server 104. Also, the authentication server 104, as described later, includes a storage destination table registered by being correlated with each of the users, and a history information table for managing the execution history of a job at each of the apparatuses.

Figure 2:
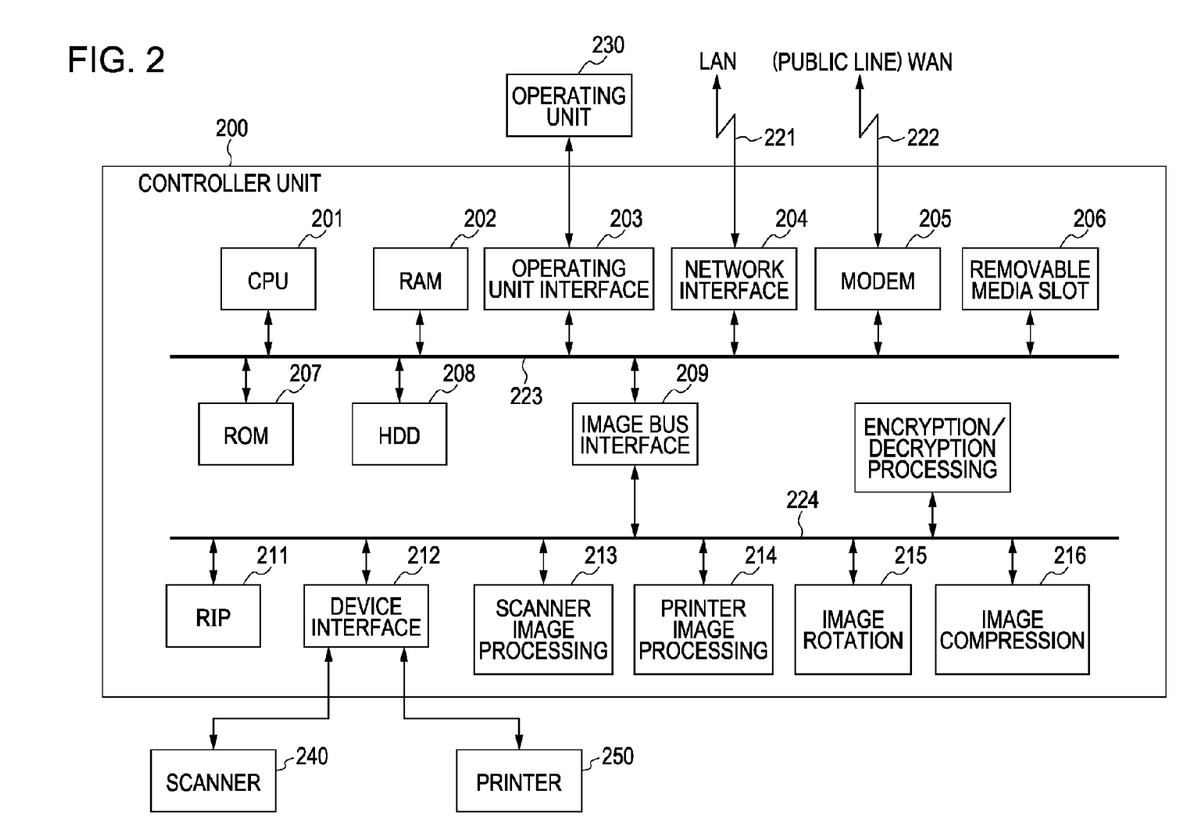
FIG. 2 is a system block diagram of a multi-function apparatus according to an embodiment of the present invention.

FIG. 2 is a system block diagram of the multi-function apparatus 101 according to the first embodiment. A controller unit 200 is connected to a scanner 240 serving as an image input apparatus, and a printer 250 serving as an image output apparatus, and controls input/output of image data and so forth. The controller unit 200 is also connected to a LAN 221 or WAN (public line) 222, and controls communication of various types of data, device information, and the like.

A CPU 201 is a controller for controlling the entire system. RAM 202 is system work memory for the CPU 201 to operate. RAM 202 is also memory for temporarily storing various types of data, and is also work memory in which various types of application are executed. ROM 207 is boot ROM, and stores a system boot program.

An HDD 208 is a hard disk drive, and stores system software, various types of data, various types of application, the histories of various types of job processed within a multi-function apparatus, and so forth. Also, the HDD 208 can be accessed from another apparatus over the network via a later-described network interface. Also, the HDD 208 stores a program code for executing processing such as illustrated in a later-described flowchart. The CPU 201 loads this program code in the RAM 202, and performs control of processing following a later-described flowchart based on this program code.

An operating unit interface 203 is an interface unit with an operating unit 230 including a touch panel, and outputs display data to be displayed on the operating unit 230 to the operating unit 230. Also, the operating unit interface 203 also serves a roll for propagating an instruction input by a user in the operating unit 230 to the CPU 201.

The network interface 204 is connected to the LAN 221 (LAN 106 in FIG. 1), and performs input/output of various types of data. A modem 205 is connected to a WAN (public line) 222, and performs input/output of facsimile data. The respective units mentioned so far are disposed over a system bus 223.

An image bus interface 209 is a bus bridge for connecting a system bus 223, and a bus 224 for transferring image data or the like at high speed, and converting a data structure. The bus 224 is made up of a PCI bus, IEEE 1394, or the like.

The following devices are disposed on the bus 224. An RIP (raster image processor) 211 expands the PDL (Page Description Language) code received from the PC 103 or the like into a bitmap image. A device interface 212 connects the scanner 240 or printer 250 serving as an image input/output device with the controller unit 200.

A scanner image processing unit 213 subjects the scan data input from the scanner 240 to correction, processing, and editing. A printer image processing unit 214 subjects the print data output to the printer 250 to image correction, resolution conversion, or the like. An image rotation unit 215 performs rotation of image data. An image compression unit 216 performs compression processing of multi-value image data to JPEG, binary image data to JBIG, MMR, MH format, or the like, and decompression processing of compressed image data.

A removable media slot 206 is a slot to which a detachable data storage medium such as a memory card or the like can be connected, whereby image data and so forth can be stored and read out. With the first embodiment, let us say that IC cards in which user information for user authentication is stored are employed for authenticating a user operating the multi-function apparatus 101. Note that storage media employed for user authentication may be such IC cards, or magnetic cards. Alternatively, user authentication may be performed by inputting a user ID and a password from the operating unit 230 instead of employing a storage medium. Let us say that the multi-function apparatus 102 also has the same configuration.

Figure 3:
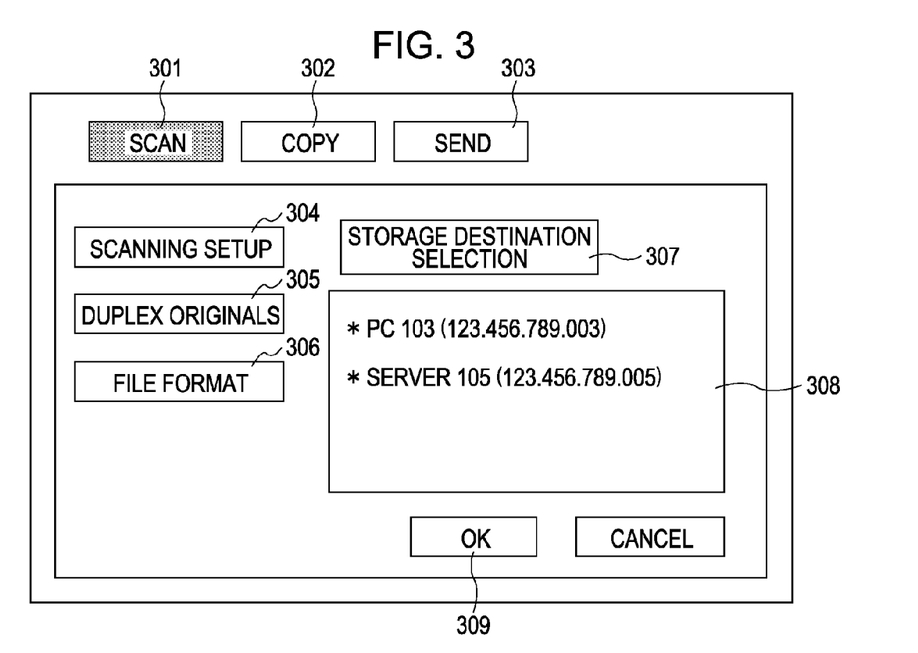
FIG. 3 is a scan mode basic screen displayed on an operating screen according to an embodiment of the present invention.

FIG. 3 illustrates a screen to be displayed on the display device included in the operating unit 230 in the multi-function apparatus 101. Upon the user pressing a mode key 301, a scan mode basic screen is displayed as illustrated in FIG. 3. The screen shown in FIG. 3 is the scan-mode basic screen which is displayed in the case in which the user operating the multi-function apparatus 101 inputs user information for log-in, authentication at the authentication server 104 is completed, and the user logs in.

The scan mode is a mode for performing processing for storing the data input by scanning an original using the scanner 240 in the storage area selected by the user. Note that the multi-function apparatus 101 according to the first embodiment includes a copy mode, and a sending mode as well as the scan mode. Upon the user pressing a mode key 302, a copy-mode basic screen is displayed. The copy mode is a mode for performing processing for printing out the data, which has been input by scanning an original using the scanner 240, using the printer 250. Upon the user pressing a mode key 303, a sending mode basic screen is displayed. The sending mode is a mode for performing processing for sending the data, which has been input by scanning an original using the scanner 240, or which has been stored in a storage area within the HDD 208 beforehand, using an E-mail or facsimile communication. Description has been made here regarding the case of including the above-mentioned three modes, but the function or mode other than the above may be included.

A scanning setup button 304 shown in FIG. 3 is pressed in the case of setting detailed scanning conditions at the time of scanning an original using the scanner 240. Upon the user pressing the scanning setup button 304, a scanning conditions detailed setup screen is displayed, where the user can set color/monochrome designation or scanning resolution. A duplex original button 305 is pressed in the case of scanning an original whose both sides are printed. Upon the user pressing the duplex original button 305, a duplex original designation screen is displayed, where the user can designate duplex originals and the direction of originals. A file format button 306 is pressed in the case of designating the format of image data to be input by scanning an original. Upon the user pressing the file format button 306, a file format setup screen is displayed, where the user can select and set a file format such as PDF, TIFF, or the like.

A storage destination selection button 307 is pressed in the case of selecting and designating the storage destination of image data scanned and input by the scanner 240. Upon the user pressing the storage destination selection button 307, a later-described storage destination selection screen is displayed. The storage destination selected and set on the storage destination selection screen by the user is displayed on a storage destination display area 308. Note that as shown in FIG. 3, as long as a plurality of storage destinations are designated, the user can store data in each of the storage destinations by one-time scan operation.

Figure 4:
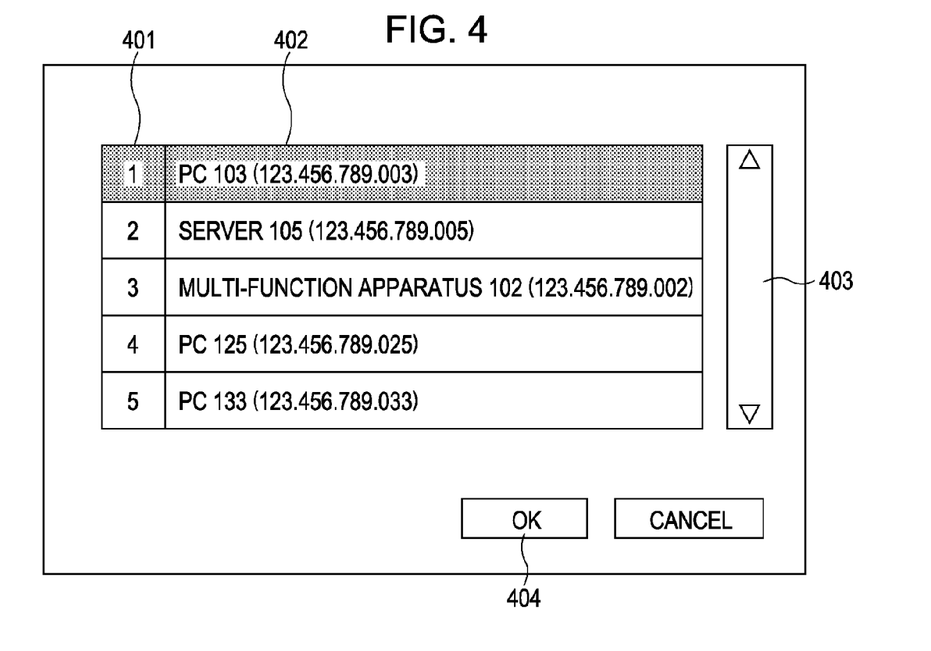
FIG. 4 is a storage destination selection screen displayed on an operating screen according to an embodiment of the present invention.

FIG. 4 is an example of a storage destination selection screen which is displayed in the case of the user pressing the storage destination selection button 307. On a storage destination candidates display area 402, information indicating selectable storage destination candidates is sorted and displayed in a state in which the order of the determined priorities can be identified based on the priority of each of the storage destinations determined with a later-described method. At this time, the order based on the priorities is displayed on an area 401 such as 1, 2, 3, and so on.

On the storage destination candidates display area 402, the name and IP address of each of the storage destinations are displayed here, but any ones of the names or IP addresses may be displayed here, or as long as information indicates a storage destination, the other types of information may be displayed here. A scroll bar 403 is displayed in a case wherein there are a great number of storage destination candidates, and is used in the case of displaying and confirming the other candidates not displayed on the storage destination candidates display area 402.

As described above, a touch panel is employed for the display device of the operating unit 230, so in the case of selecting any one of the storage destinations displayed on the storage destination candidates area 402, the user can select the relevant storage destination by touching the display area of information indicating the relevant storage destination. In FIG. 4, "PC 103" is in a selected state. With this storage destination selection screen, in a state in which any one of the plurality of storage destinations, or the plurality of storage destinations are displayed, upon the user pressing an OK button 404, the selected storage destination candidates are set as the storage destinations of data, and the screen shown in FIG. 3 is returned. Further, in the screen shown in FIG. 3, upon the user pressing the OK button 309 in a state in which one or more storage destinations are set, scanning of originals by the scanner 240 is started.

Figure 5:
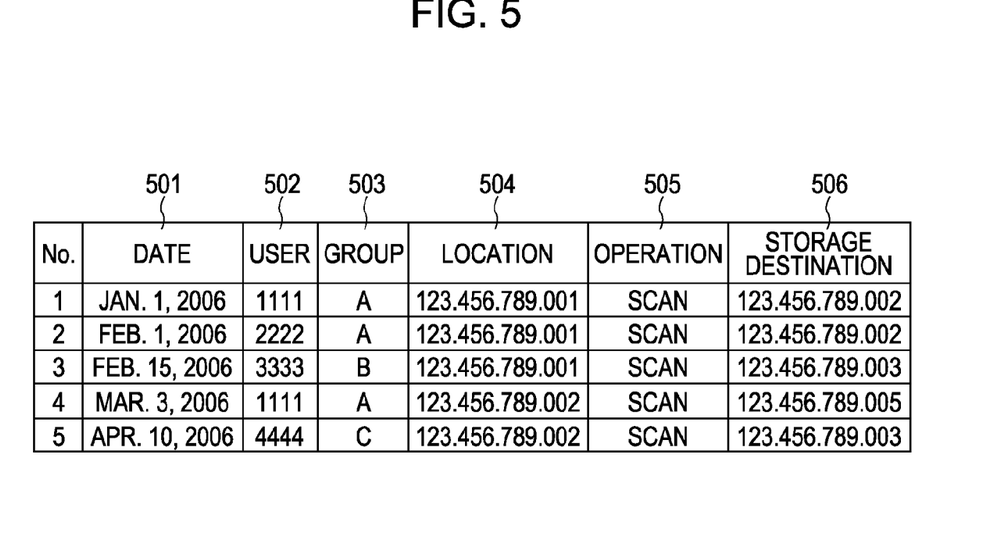
FIG. 5 is a history information table according to an embodiment of the present invention.

FIG. 5 illustrates a history information table which is stored in the case of the processing for storing the original scanned by the scanner 240 in the selected storage destination. This history information table is managed within the authentication server 104. Note that history information is stored in each case wherein the user executes the copy function or sending function, but description will be made here regarding only the history information stored in the case of the user executing operation in the scan mode.

In a date information column 501, information relating to date in which the user executes the processing is stored. Note that an arrangement may be made wherein not only date but also point-in-time information are stored together. In a user information column 502, information indicating the user designating execution of the processing is stored. In a group information column 503, information indicating a group to which the user designating the processing belongs is stored. Here, group information such as A through C shown in FIG. 5 may be directly input by the user, or the group information may be managed with the HDD 208 or the like in a manner correlated with each of the user information beforehand. Alternatively, an arrangement may be made wherein the relevant group information is automatically read out and written in the history information table in a case in which each of the users logs in.

In an execution location information column 504, information indicating the apparatus which the user actually performed an operation instructing execution of the processing is stored. In FIG. 5, the IP addresses of the multi-function apparatuses which performed the processing are described, but as long as information can identify an apparatus, the other information other than IP addresses may be stored. In an operation information column 505, information indicating the contents of the actual processing is stored. Description will be made here regarding only the operation in the scan mode, so in FIG. 5 all are displayed as "scan", but the other information to be stored includes "copy", "facsimile transmission", and so forth. In a storage destination information column 506, information indicating the storage destination where the image data scanned and obtained by the scanner 240 is stored in the scan mode is stored. The IP addresses of the apparatuses selected as storage destinations are described here, the information other than IP addresses may be stored, and also in the case of data being stored in the plurality of storage destinations, information indicating each of the storage destinations is stored.

In FIG. 5, for example, a job of history No. 1 shows a state in which on Jan. 1, 2006 a user 1111 belonging to a group A scanned originals at a multi-function apparatus of 123.456.789.001, and stored the readout data (the scanned image data) in 123.456.789.002. With regard to the execution history information of each job, the information is notified to the authentication server 104 as soon as the processing at each of the multi-function apparatuses is completed, and is written into the history information table. Note that with the first embodiment, description will be made assuming that the authentication server 104 manages the history information table, but the history information table may be managed with a storage area (e.g., HDD 208) within the multi-function apparatus 101.

Figure 6:
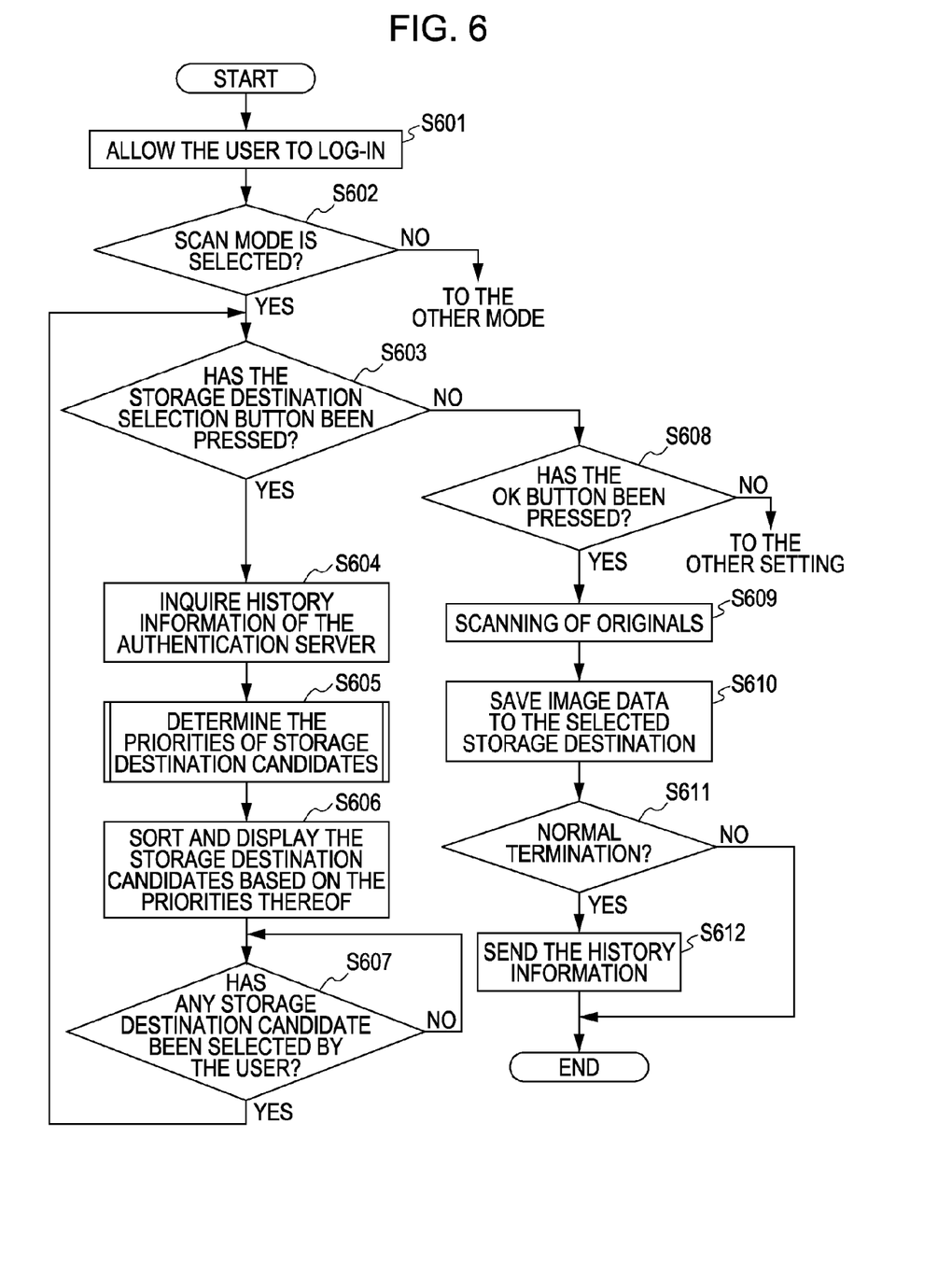
FIG. 6 is a flowchart illustrating operations according to an embodiment of the present invention.
Figure 7:
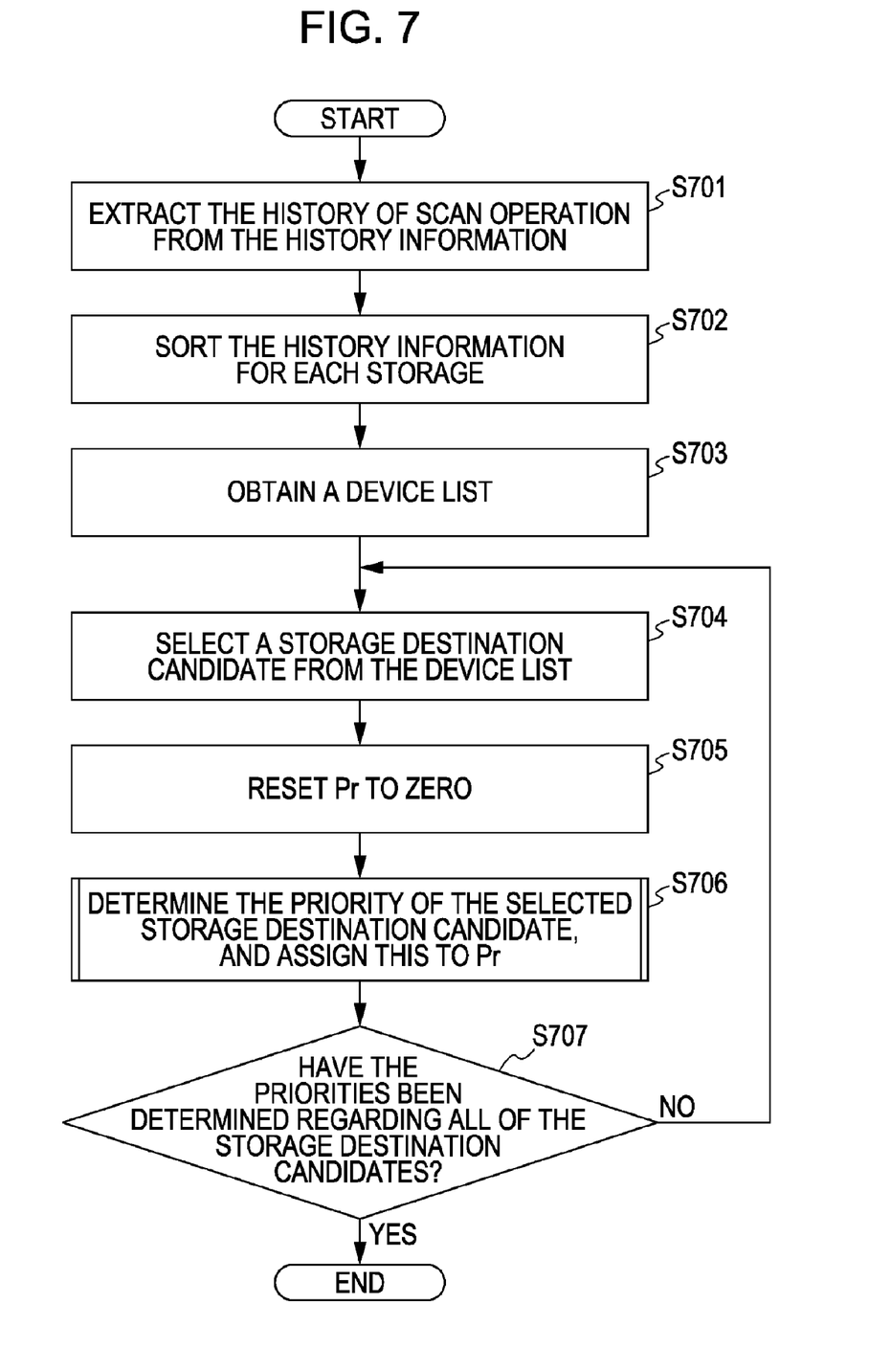
FIG. 7 is a flowchart illustrating operations according to an embodiment of the present invention.
Figure 8:
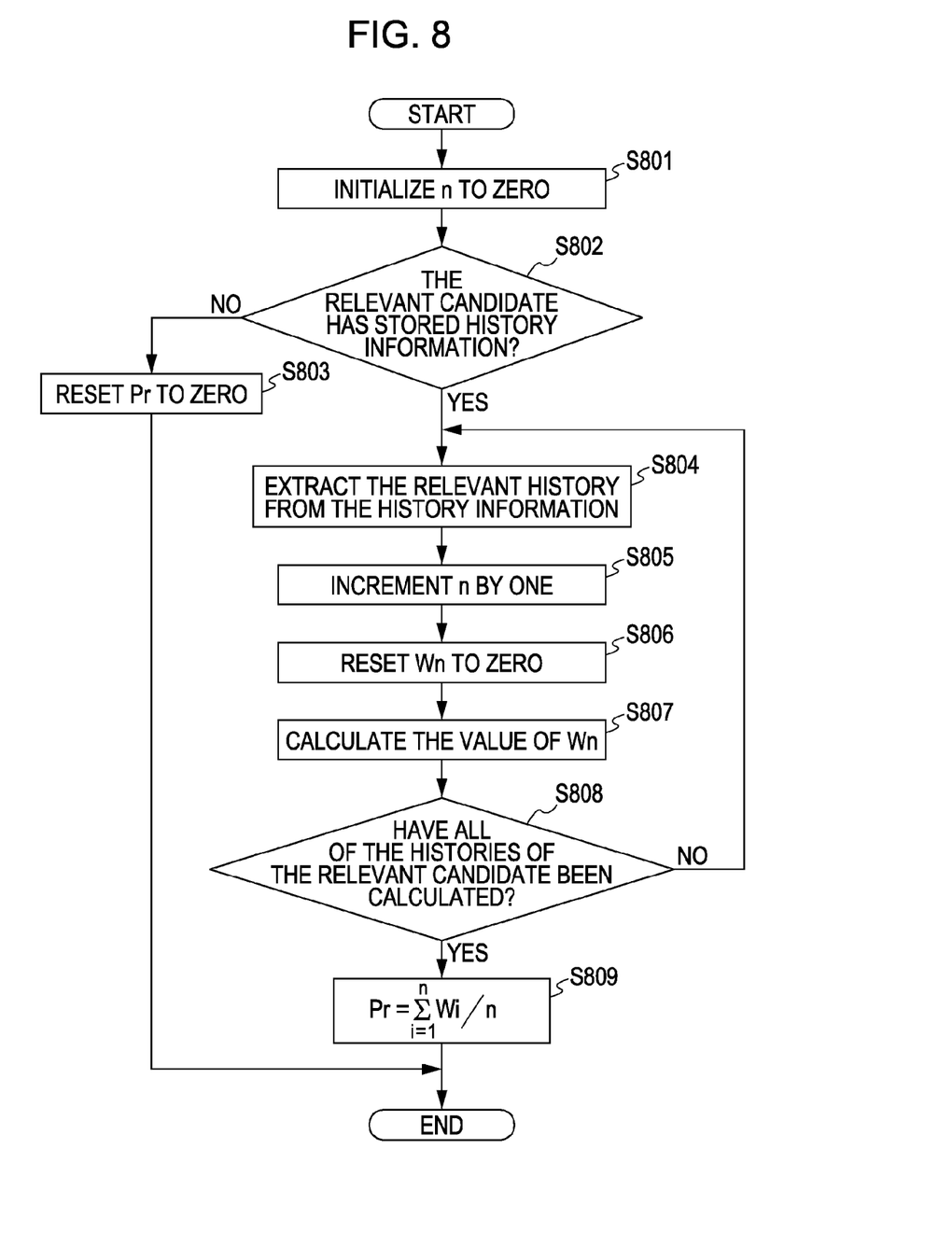
FIG. 8 is a flowchart illustrating operations according to an embodiment of the present invention.

Next, description will be made in detail regarding operation sequence and processing flow according to scanning of originals and storage of image data in the scan mode with reference to flowcharts shown in FIGS. 6 through 8. FIGS. 6 through 8 are flowcharts illustrating the operations controlled by the CPU 201 of the multi-function apparatus 101 in the scan mode in a comprehensible manner.

First, in step S601 in FIG. 6, the CPU 201 allows the user to log in based on user information that has been input. Though details relating to user authentication are not shown in the flowchart shown in FIG. 6, the CPU 201 reads out user information from an IC card, and sends the user information thereof to the authentication server 104. Subsequently, the authentication server 104 compares the sent user information with the user information registered beforehand, and the CPU 201 receives the comparison result thereof from the authentication server 104, and performs processing for allowing the user to log in based on the received result.

Next, in step S602, of the modes included in the multi-function apparatus 101, the CPU 201 determines regarding which mode the user designates. Here, in the event that the scan mode is selected, the CPU 201 proceeds to step S603, and in the event that the mode other than the scan mode is selected, the CPU 201 proceeds to processing of the other mode (detailed description will not be made here).

In step S603, of buttons 304 through 307, and 309 shown in FIG. 3, the CPU 201 determines regarding whether or not the user pressed the storage destination selection button 307. In the event of the user pressing the storage destination selection button 307, the CPU 201 proceeds to step S604, and accesses the authentication server 104 to obtain the history information table. Note that obtaining of history information here may be omitted in the case of employing no history information at the time of later-described determination of the priorities of storage destination candidates.

In the subsequent step S605, the CPU 201 determines the priorities of storage destination candidates. The details of this processing relating to the determination of priorities will be described later. In subsequent step S606, the CPU 201 sorts storage destination candidates based on the priorities of the storage destination candidates determined in step S605, and displays these on the storage destination candidates display area 402. Further in step S607, the CPU 201 determines regarding whether or not the user selected at least one of the storage destination candidates displayed on the storage destination candidates display area 402, and in the event of the user selecting at least one of the storage destination candidates, the CPU 201 sets the selected storage destination candidates as storage destinations, and returns to step S603.

In step S603, in the event that the user has not pressed the storage destination selection button 307, the CPU 201 proceeds to step S608, and determines regarding whether or not the OK button 309 has been pressed. In the event of the user pressing the OK button 309, the CPU 201 proceeds to step S609. In the event that the user has not pressed the OK button 309, the CPU 201 proceeds to processing for performing the other setting (e.g., setting of scanning, or setting of a file format). Note that with the flowchart shown in FIG. 6, following allowing the user to log-in in step S601, the CPU 201 proceeds to step S608 without performing processing in steps S604 through S607 in some cases. These cases include a case wherein a default storage destination has been already set in a manner correlating with the user who has logged in, or a case wherein the storage destination at the time of executing the processing in the previous scan mode has been stored, and the storage destination thereof is read out to be displayed on the storage destination display area 308. In these cases, the processing wherein the user selects and sets a storage destination through the processing in steps S604 through S607 can be omitted. Further, the user may be allowed to press the OK button 309 only in a state in which at least one storage destination has been set. In other words, the user is prevented from performing the processing for storing the scanned image data in a state in which no storage destination has been set on the storage destination display area 308, so for example, the OK button 309 may be displayed in a gray-out manner.

In step S609, the CPU 201 executes scanning of originals using the scanner 240, and in subsequent step S610 the CPU 201 sends image data to the apparatuses set as the storage destinations. Upon the storage being completed normally in step S611, in step S612, the CPU 201 sends the history information to the authentication server 104, and ends the processing. In the event that storage of image data has not been completed normally, e.g., in a case wherein the storage destination is in a memory-full state, or in a case wherein a communication trouble occurs, the CPU 201 ends the processing without sending the history information. Note that an arrangement is made here wherein in the event that the storage processing has not been completed normally, the CPU 201 sends no history information, but an arrangement may be made wherein even in the event that the storage processing has not been completed normally, the CPU sends the history information.

FIG. 7 is a flowchart describing the processing executed in step S605 in the flowchart shown in FIG. 6 in detail. In step S605, the CPU 201 determines the priority as to each of the storage areas (e.g., external apparatuses) selected as the storage destination candidates.

First, in step S701 shown in FIG. 7, the CPU 201 extracts only the histories of the operations processed in the scan mode from the history information table obtained from the authentication server 104 in step S604. In subsequent step S702, the CPU 201 sorts the histories extracted in step S701 for each storage destination (information shown in 506 in FIG. 5). Note that the processing in step S701 and step S702 is processing for improving efficiency of each of later-described processing steps for determining the priorities, which can be omitted if unnecessary, or which can be performed at the other timing.

Next, in step S703 the CPU 201 obtains a list of the respective apparatuses selected as the storage destination candidates. With the first embodiment, the administrator defines selectable device candidates as storage destinations for each user beforehand, and the CPU 201 reads out the devices managed within the multi-function apparatus 101. In other words, external devices selectable as storage destinations are determined for each user who has logged-in in step S601 shown in FIG. 6, the CPU 201 reads out a list of the devices thereof from the HDD 208 or the like, for example. Note that it is not necessary to define and manage this device list beforehand as described above, so an arrangement may be made wherein whenever the device list is necessary, the CPU 201 searches the respective devices over the network using a suitable device search technique, and lists the searched devices as storage destination candidates.

In step S704 the CPU 201 extracts any one of the devices within the device list as storage destination candidates. Subsequently, in step S705 the CPU 201 sets Pr (value shows the priority of each device) to zero, and proceeds to step S706. In step S706, the CPU 201 determines the value of Pr as to the external device extracted in step S704, and temporarily stores this in the ROM 207 or the like. The details of the processing in step S706 will be described later.

In step S707, the CPU 201 determines regarding whether or not the value of Pr has been determined as to all of the devices within the device list. In the event that there is still a storage destination candidate whose Pr value has not been determined, the CPU 201 returns to step S704, and determines the value of Pr as to the device whose Pr value has not been determined. In step S707, in the event that the value of Pr has been determined as to all of the storage destination candidates, the CPU 201 ends the processing.

FIG. 8 is a flowchart describing the processing executed in step S706 within the flowchart shown in FIG. 7 in detail. In step S706, the CPU 201 determines the value of Pr of each candidate. A value Wn for determining the priority as to each history included in the history information extracted in step S701 is calculated here, and further, the mean value of the value Wn calculated from the histories designated with the device as a storage destination is calculated for each storage destination candidate, and determines the priority thereof.

First, in step S801 the CPU 201 sets the value of n to zero. Next in step S802, the CPU 201 determines regarding whether or not the history of the processing performed in the scan mode with the device extracted as a storage destination in step S704 is included in the histories extracted in step S701. In the event that there is no relevant history, the CPU 201 proceeds to step S803, determines the value of Pr as zero, and ends the processing.

On the other hand, with the determination in step S802, in the event that determination is made that there are at least one or more relevant histories (i.e., executed with the device extracted in step S704 as a storage destination), the CPU 201 proceeds to step S804, and extracts any one of the relevant histories. In step S805 the CPU 201 increments the value of the n by one, and further in step S806, sets the value of the Wn to zero. In subsequent step S807, the CPU 201 calculates the value of the Wn of the history extracted in step S804. Description will be made later regarding the details of this calculation method.

In step S808, the CPU 201 determines regarding whether or not with the device extracted as a storage destination in step S704, the value of the Wn as to all of the histories where the processing in the scan mode was performed has been calculated. In the event that there is still a history whose calculation has not been performed, the CPU 201 returns to step S804, and repeats the processing in steps S804 through S808. In the event that the value of the Wn as to all of the relevant histories has been calculated, the CPU 201 proceeds to step S809, and determines the value of Pr.

With a computational expression of the value of Pr here, as shown in FIG. 8, the value of the Wn calculated for each of the histories is all totaled, and the total thereof is divided by the sum of the relevant histories (i.e., value of n). When the value of Pr is determined in step S809, the CPU 201 ends the processing here.

Figure 9:
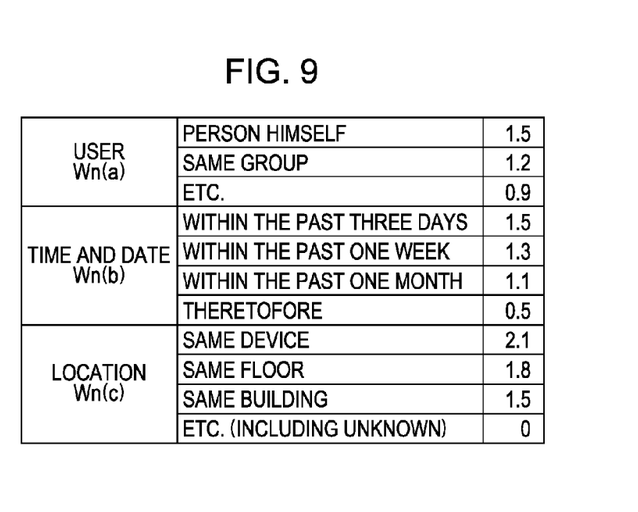
FIG. 9 is a parameter table for determining properties according to an embodiment of the present invention.

FIG. 9 illustrates a parameter table for calculating the value of the Wn in step S807 shown in FIG. 8. Here, in an embodiment, three types of a parameter (Wn(a)) relating to a user, a parameter (Wn(b)) relating to date, and a parameter (Wn(c)) relating to a place are employed to determine the priority of each of the devices selected as the storage destination candidates. With the parameter relating to a user, an operator (i.e., the user logged-in in step S601) and the executor of the job of each history are compared, a value is set according to the relation thereof.

For example, in the even that the user logged-in in step S601 and the user instructed the execution of the job of a certain history are the same, i.e., in the event of the history of the job which the person himself/herself operated, a value such as Wn(a)=1.5 is set. Also, for example, in the event of the history of the job which the user belonging to the same group instructed to execute, though the log-in user and the user instructed the execution of the job are not the same, a value such as Wn(a)=1.2 is set.

Next, with regard to the parameter relating to date, a weighting is set depending on the date when the job of the history thereof was executed. For example, in the event of the history of the job executed within the past three days, a value such as Wn(b)=1.5 is set, and in the event of the history of the job executed one month or more ago, a value such as Wn(b)=0.5 is set.

Further, with regard to the parameter relating to a place, a weighting is set as to the device currently being operated (i.e., multi-function apparatus 101 here) depending on the physical positional information of the device in which the execution of the job of each history was instructed. For example, in the event that the multi-function apparatus 101, and the device in which the execution of the job of a history was instructed are the same device, a value such as Wn(c)=2.1 is set. Similarly, in the event that the device in which the execution of the job of a history was instructed is not the multi-function apparatus 101, when the device thereof is on the same floor, Wn(c)=1.8 is set, and when the device thereof is in the same building, Wn(c)=1.5 is set. Further, in the event that the positional information of the device in which the execution of the job of a history was instructed is unknown, Wn(c)=0 is set.

Note that an arrangement may be made wherein the positional information of each device is defined by the administrator beforehand, which is managed within the multi-function apparatus 101, or an arrangement may be made wherein an external server such as the authentication server 104 obtains the information managed in an integrated manner.

As described above, a value for weighting is set to each of the parameters, and the value of the Wn is calculated based on a computational expression such as Wn=Wn(a)+Wn(b)+Wn(c). In other words, this means that the closer the relation between the operator and the person who instructed the execution of the job of a history is, also the closer to the current point-in-time the date in which the job of a history was executed is, and further, the closer to the device currently being operated the device in which the execution of the job of a history was instructed is, the greater the value of the Wn.

Upon the value of Pr of each device being determined in accordance with the flowcharts in FIG. 7 and FIG. 8, in step S706 shown in FIG. 7 the storage destination candidates are displayed on the storage destination candidates display area 402 in the descending order from the device having the highest Pr value. Thus, when the user selects the storage destination of image data from the storage destination candidates using the screen shown in FIG. 4, the candidates are displayed in the descending order from the candidate having the highest priority, so the user can readily select a desired storage destination.

Now, a specific example will be described wherein the priority of each of the devices serving as storage destination candidates is determined based on the history information table shown in FIG. 5. Note here that with regard to IP addresses described as information indicating each device, only the lower three digits will be employed for description in a simplified manner such that 123.456.789.001 is referred to as "001". Further, as the current situation, let us say that on May 1, 2006 a user 2222 belonging to a group A attempts to execute operation in the scan mode at location "001". Also, let us say that the weighting of each parameter is shown in FIG. 9, and the value of the Wn is obtained by Wn=Wn(a)+Wn (b)+Wn(c). Further, let us say that "001" and "002" are different devices, and installed on the same floor.

First, as for history No. 1 shown in FIG. 5, the user belongs to the same group, so Wn(a)=1.2, execution is done four months ago, so Wn(b)=0.5, the execution is done in the same device, so Wn(c)=2.1, and consequently, Wn=1.2+0.5+2.1=3.8 is obtained. Similarly, history No. 2 is Wn=1.5+0.5+2.1=4.1. History No. 3 is Wn=0.9+0.5+2.1=3.5. History No. 4 is Wn=1.2+0.5+1.8=3.5. History No. 5 is Wn=0.9+1.1+1.8=3.8.

Figure 10:
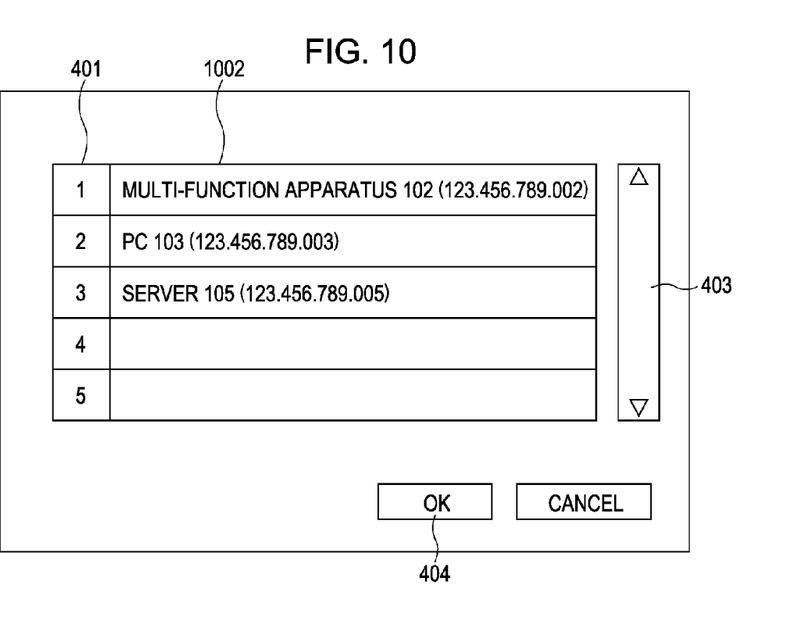
FIG. 10 is a storage destination selection screen displayed on an operating screen according to an embodiment of the present invention.

Based on the above result, upon the computational expression in step S809 shown in FIG. 8 being employed, the Pr of the device "002" serving as a storage destination candidate is (3.8+4.1)/2=3.95, the Pr of the device "003" is (3.5+3.8)/2=3.65, and the Pr of the device "005" is 3.5. As a result thereof, as shown in FIG. 10, on a storage destination candidate display area 1002 the storage destination candidates are sorted and displayed in the order of "002", "003", and "005". Note that calculations were performed regarding the above-mentioned three candidates alone this time, so the fourth candidate and on are not displayed, but the candidates whose calculations were not performed may be displayed without order thereof.

The respective values in the parameter table shown in FIG. 9 may be set by the user without any restriction. Thus, for example, it becomes possible to increase only the value of a weighting relating to "place", or to decrease only the value of a weighting relating to "user", or the like, and further, sorting of storage destinations along with the intension of the user can be performed, which improves ease-of-use. Also, at this time, with regard to the two of the above-mentioned three item parameters, the values may be set to all "0". In other words, for example, the values of the parameters of "user" and "place" are set to all zero, whereby the priority of each storage destination candidate can be determined in accordance with the parameter referred to as "date" alone. Further, the parameters referred to as "user", "date", and "place" are combined here, but originally the priorities may be determined based on any one of these, or the priorities may be determined with the other parameters.

Also, an arrangement may be made wherein the user is allowed to change not only the value of the Wn but also the above-mentioned computational expression for obtaining the Wn. For example, the user may be allowed to change the above-mentioned computational expression such as changing Wn=Wn(a)+Wn(b)+Wn(c) to Wn=3Wn(a)+Wn(b)+2Wn(c).

As described above, according to the first embodiment, in the event of displaying information indicating a plurality of storage destinations selectable as a storage destination of data, the priority of each of the storage destinations is determined, and the information indicating the plurality of storage destinations can be sorted and displayed based on the determined priorities. In other words, when the user stores data, storage destinations which have a high probability of being selected are displayed in an identifiable manner, whereby the user can reduce his/her work for searching a desired storage destination, which improves ease-of-use.

Second Embodiment

Next, description will be made regarding a second embodiment of the present invention. Note that description will be omitted regarding the same configurations as those in the first embodiment here. The differences between the first embodiment and the second embodiment are in that devices are simply selected as storage destinations of image data, and also image data can be stored by specifying a storage area provided within each device, and in that with the first embodiment, description has been made regarding only the case of storing in an external device, but with the second embodiment, a storage area provided in the HDD 208 provided within the multi-function apparatus 101 can be selected.

Figure 11:
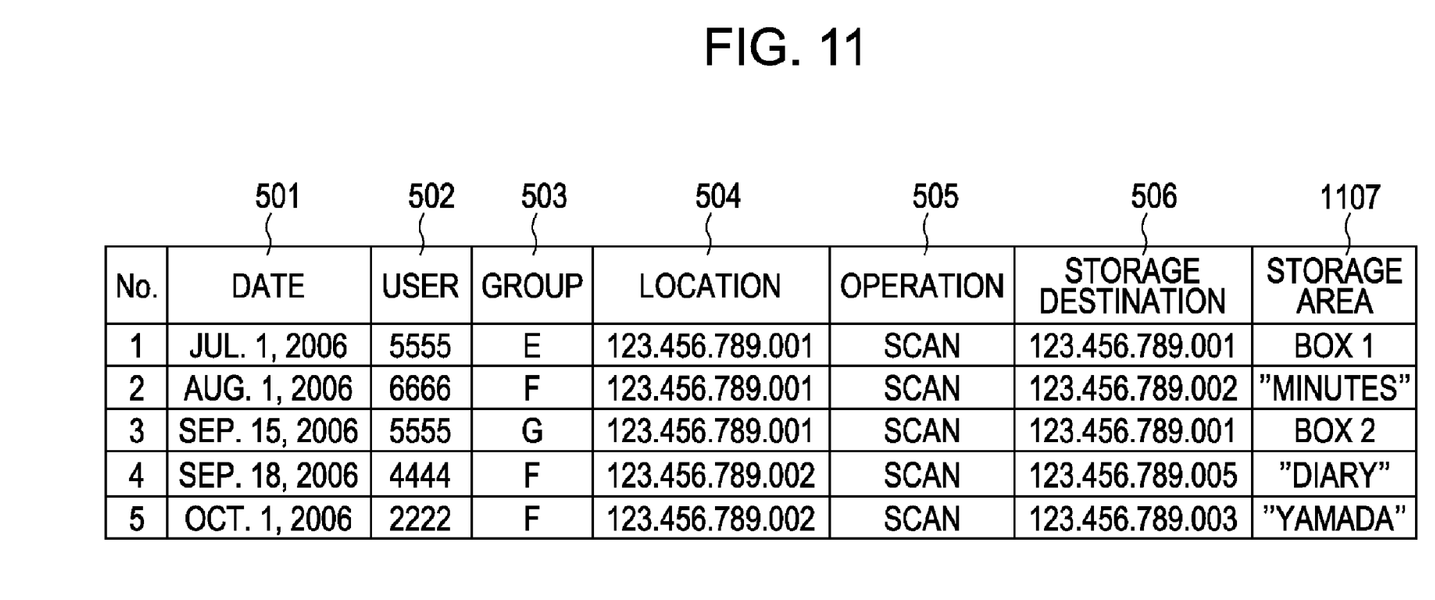
FIG. 11 is a history information table according to an embodiment of the present invention.

FIG. 11 is a history information table managed by the authentication server 104 according to the second embodiment. Now, as for the differences as to the history information table shown in FIG. 5, for example, with operation of history No. 1, it can be understood that image data is stored from the device "001" to the device "001". That is to say, the second embodiment enables the image data scanned and obtained to be stored in the storage area included in the self-device. Also, information indicating "storage area" is newly described in an area 1107. This is information indicating in which storage area within an external device over the network or within the multi-function apparatus 101 image data is stored.

Thus, with the second embodiment, the priority is determined as to each of the storage areas within each device including the storage area which is set in the HDD 208 within the multi-function apparatus 101, and information indicating the storage destinations is sorted and displayed based on the determined priorities.

Note that the processing flow according to the second embodiment is similar to the flowcharts shown in FIG. 6 through FIG. 8, so description will be made principally regarding the differences thereof here. First, as for the flowchart shown in FIG. 6, not only information indicating a device as a storage destination but also information indicating a storage area within the device thereof are displayed. Note that even with storage areas within the same device, the priorities thereof differ, so there is a case in which a plurality of information indicating the same device are arrayed on the list.

Figure 12:
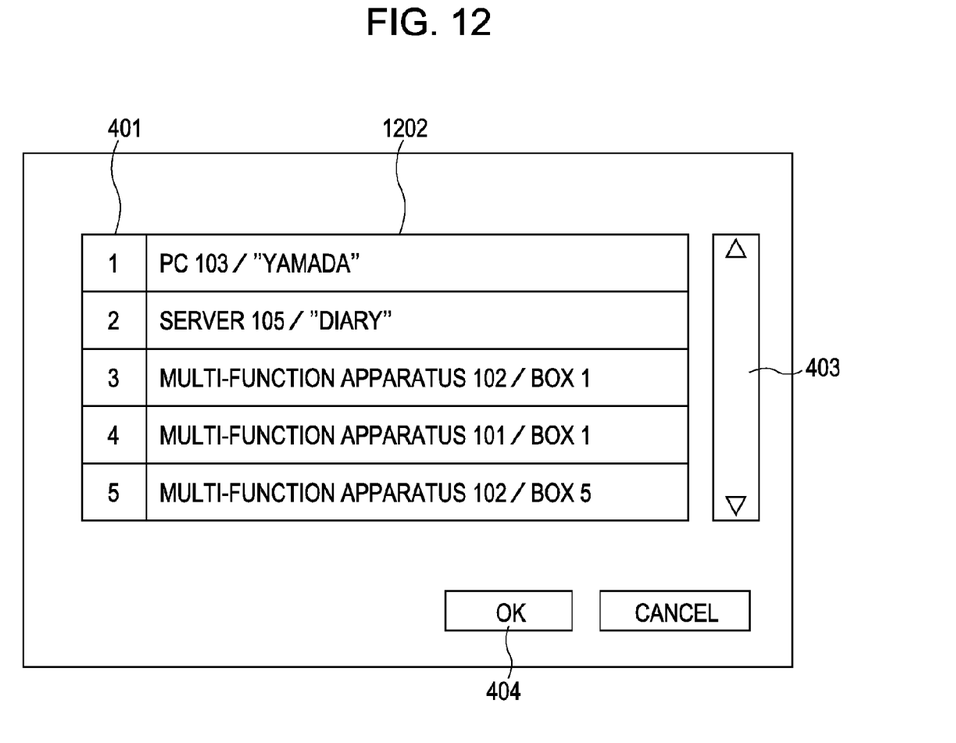
FIG. 12 is a storage destination selection screen displayed on an operating screen according to an embodiment of the present invention.

FIG. 12 is a screen according to the second embodiment which corresponds to the storage destination selection screen shown in FIG. 4. As shown in FIG. 12, on a storage destination candidate display area 1202 information for identifying each device (e.g., "PC 103"), and also information indicating a storage area which is set within the device thereof (e.g., "YAMADA") are displayed. Also, "box 1" of candidate No. 1 and "box 5" of candidate No. 5 are both storage areas provided in "multi-function apparatus 102", but the priorities thereof are independently determined and displayed.

Next, as for the flowchart shown in FIG. 7, with the second embodiment, instead of the device list handled each in step S703 and step S704, a storage area list is employed. Subsequently, in step S706, the value of Pr is determined as to each of the storage areas.

As for the flowchart shown in FIG. 8, when extracting "relevant" history in step S804, with the first embodiment, extraction is made for each device which is set as a storage destination, but with the second embodiment, extraction is made for each storage area which is set as a storage destination.

As described above, with the second embodiment, each of the priorities can be determined as to each of the storage areas selectable as storage destinations, and can be sorted and displayed, thereby further improving ease-of-use.

Note that the storage area of each device is set with a hierarchical structure, not only information indicating a device and a storage area as described above, but also path information for identifying the storage area thereof may be displayed on the storage destination candidate display area 1202. In this case, for example, if we say that a folder referred to as "data" is set within "box 5" included in the multi-function apparatus 102, such as "multi-function apparatus 102"/"box 5"/"data" is displayed.

Also, as for information indicating storage destinations, as shown in FIG. 4, description has been made regarding an example wherein storage destinations are arrayed and displayed in the order of descending priorities in a list format as shown in FIG. 4, but the other display method may be employed. For example, the order of priorities or the values of priorities may be displayed without sorting, and various types of display method can be conceived such that background colors are changed and displayed in the order of descending priorities, and so forth.

Also, with the above description, an arrangement has been made wherein a priority is determined as to each of the storage areas provided within an external device via the network, or the self-apparatus (multi-function apparatus 101), but a priority may be determined as to each of the storage areas within the self-apparatus alone. Thus, even with an apparatus in an off-line state which is not connected to the network for example, information indicating each of the storage areas is sorted and displayed in accordance with the determined priorities, thereby improving ease-of-use. Note that, in this case, the respective functions (such as processing relating to user authentication, management of the history information table, etc.) provided by the authentication server 104 are provided from each function units included in the multi-function apparatus 101.

Also, with the first and second embodiments, description has been made regarding storing the image data input by scanning originals using the scanner 240 in any one of the storage areas, but the data to be stored is not restricted to the image data scanned by the scanner 240. In other words, for example, a case can be conceived wherein the user stores image data received via the network in a desired storage area. Also, a case can be conceived wherein a storage destination is selected in the event that the data stored in the HDD 208 or the like beforehand is moved or copied. Further, the data to be stored is not restricted to image data, so any format can be employed, such as text data, audio data, moving-image data, and so forth, as long as the data to be stored is electronic data.

Other Embodiments

The embodiments have been described in detail so far, but the present invention can also be applied to an embodiment serving as a system, apparatus, method, program, storage medium (recording medium), and so forth. Specifically, the present invention may be applied to a system made up of a plurality of apparatuses, or may be applied to an apparatus made up of one instrument.

Note that with the present invention, the software program for realizing the functions of the above embodiments (with the embodiments, the program corresponding to the flowcharts shown in the drawings) is supplied to a system or apparatus, either directly or remotely. The present invention also includes a case wherein the computer included in the system or apparatus thereof reads out and executes the supplied program code.

Accordingly, the program code itself to be installed in the computer for realizing the function processing of the present invention also realizes the present invention. In other words, the present invention also includes the computer program itself for realizing the function processing of the present invention.

In this case, as for the format of the computer program thereof, as long as the computer program includes the function of a program, any format may be employed, such as an object code, a program executed by an interpreter, script data to be supplied to an operating system, or the like.

Examples of recording mediums for supplying the program include, but are not restricted to, the following; floppy disks, hard disks, optical discs, magneto-optical disks, MOs, CD-ROMs, CD-Rs, CD-RWs, magnetic tape, nonvolatile memory cards, ROM, and DVDs (DVD-ROM, DVD-R).

Additionally, as for a method for supplying the program, the program can be also supplied by downloading the program in a recording medium such as a hard disk or the like from a homepage in the Internet using a browser of a client computer. That is to say, the user connects to a homepage, and downloads the computer program itself of the present invention from the homepage, or a file which is compressed including an automatic install function. Alternatively, the program code making up the program of the present invention is divided into a plurality of files, and each of the files is downloaded from a different homepage, whereby the program can be supplied. In other words, the present invention also includes a WWW server for allowing multiple users to download the program file for realizing the function processing of the present invention at a computer.

Also, the program of the present invention may be encrypted and stored in storage media such as CD-ROM or the like, with the storage media being distributed to users. Subsequently, users satisfying predetermined conditions are allowed to download key information from a homepage via the Internet for unlocking the encryption. Subsequently, the users execute the encrypted program by using the key information to cause a computer to install the program, whereby the program can be supplied.

Also, the computer executes the program, whereby the functions of the above-mentioned embodiments can be realized. Additionally, the operating system or the like running on the computer performs a part or all of the actual processing based on the instructions of the program thereof, and according to the processing thereof, the functions of the above-mentioned embodiments can also be realized.

Further, the program that has been read out from the recording medium may be written into memory included in a function expansion board inserted in the computer, or a function expansion unit connected to the computer, whereby the functions of the above-mentioned embodiments can be realized. In other words, the functions of the above-mentioned embodiments can also be realized by the CPU or the like included in the function expansion board or function expansion unit thereof performing a part or all of the actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-158632 filed Jun. 7, 2006, which is hereby incorporated by reference herein in its entirety.

What is claimed is:

1. An apparatus comprising:
   an input unit configured to input data;
   a storing unit configured to perform storing processing in which the data input by the input unit is stored in a storage area designated as a storage destination;
   a management unit configured to manage history information of the storing processing performed by the storing unit;

a determination unit configured to determine the priorities of a plurality of storage areas which are storage destination candidates according to the history information managed by the management unit;
a display unit configured to display information indicating the plurality of storage areas based on the priorities determined by the determination unit; and
a control unit configured to control the storing unit to store the data in the storage area designated by a user according to the information displayed by the display unit.

2. The apparatus according to claim 1, further comprising:
a communication unit configured to communicate with an external apparatus connected to the data processing apparatus via a network;
wherein the storing unit transmits the data to the designated external apparatus via the communication unit in a case where the external apparatus is designated by the user as the storage destination.

3. The apparatus according to claim 1, further comprising:
a memory unit configured to store the data input by the input unit;
wherein the storing unit stores the data in the memory unit in a case where the memory unit is designated by the user as the storage destination.

4. The apparatus according to claim 3, wherein the memory unit includes a plurality of memory areas,
and wherein the display unit configured to display information indicating the plurality of memory areas in a manner by which the plurality of memory areas are identified.

5. The apparatus according to claim 1, wherein the determination unit determines the priorities based on the physical locations of the plurality of storage areas.

6. The apparatus according to claim 1, wherein the determination unit determines the priorities of the plurality of storage areas based on a date or time in which the determination unit determines the priorities.

7. The apparatus according to claim 1, further comprising:
an authentication unit configured to authenticate a user who operates the data processing apparatus;
wherein the determination unit determines the priorities of the plurality of storage areas based on the user authenticated by the authentication unit.

8. The apparatus according to claim 7, wherein the determination unit determines the priorities of the plurality of storage areas based on a group to which the user authenticated by the authentication unit belongs to.

9. The apparatus according to claim 1, further comprising:
a setting unit configured to set the priority determination condition which is used when the determination unit determines the priorities of the plurality of storage areas.

10. The apparatus according to claim 9, wherein the priority determination condition includes a plurality of parameters;
and wherein the setting unit assigns a weighting to the plurality of parameters.

11. A method comprising:
inputting data;
determining priorities of a plurality of storage areas which are storage destination candidates based on history information of previously performed storing operations;
displaying information indicating the plurality of storage areas based on the determined priorities;
receiving a user input to select one of the plurality of storage areas as a storage destination; and
transmitting the data input by the input unit to the one of the storage areas selected as the storage destination.

12. The method according to claim 11, further comprising:
receiving the history information of previously performed storing operations from an external apparatus connected via a network.

13. The method according to claim 11, wherein the inputting data comprises scanning a document.

14. The method according to claim 11, wherein the displayed information indicating the plurality of storage areas are arranged in an order according to the determined priorities.

15. A program stored on a computer-readable medium for causing an apparatus to execute:
determining priorities of a plurality of storage areas which are storage destination candidates based on history information of previously performed storing operations;
displaying information indicating the plurality of storage areas based on the determined priorities;
receiving a user input to select one of the plurality of storage areas as a storage destination; and
transmitting data to the one of the storage areas selected as the storage destination.

16. The program according to claim 15, wherein the data comprise image data generated by scanning a document.

17. A computer-readable storage medium storing instructions which, when executed by an apparatus, causes the apparatus to perform operations comprising:
determining priorities of a plurality of storage areas which are storage destination candidates based on history information of previously performed storing operations;
displaying information indicating the plurality of storage areas based on the determined priorities;
receiving a user input to select one of the plurality of storage areas as a storage destination; and
transmitting data to the one of the storage areas selected as the storage destination.

18. The computer-readable storage medium according to claim 17, wherein the data comprise image data generated by scanning a document.

19. An apparatus comprising:
a scanning unit configured to scan a document to generate data;
a determination unit configured to determine priorities of a plurality of storage areas which are storage destination candidates based on history information of previously performed storing operations;
a display unit configured to display information indicating the plurality of storage areas based on the priorities determined by the determination unit;
a user interface configured to receive a user input to select one of the plurality of storage areas displayed on the display unit as a storage destination; and
a control unit configured to transmit the data generated by the scanning unit to the one of the storage areas selected as the storage destination.

20. The apparatus according to claim 19, wherein the history information of previously performed storing operations is received from an authentication server connected via a network.

21. The apparatus according to claim 19, wherein the displayed information indicating the plurality of storage areas are arranged in an order according to the determined priorities.

22. The apparatus according to claim 19, wherein the plurality of storage areas includes a storage area of an external apparatus connected via a network.

* * * * *